(12) United States Patent
Rainov et al.

(10) Patent No.: US 11,165,464 B2
(45) Date of Patent: Nov. 2, 2021

(54) METHODS AND SYSTEMS FOR USE OF COMMON MODE REJECTION (CMR) FOR ECHO CANCELLATION IN UPLINK COMMUNICATIONS

(71) Applicant: MaxLinear, Inc., Carlsbad, CA (US)

(72) Inventors: Roman Rainov, Hod Hasharon (IL); Zan Zhang, Irvine, CA (US); Howard Chan, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 189 days.

(21) Appl. No.: 16/406,720

(22) Filed: May 8, 2019

(65) Prior Publication Data

US 2019/0349026 A1 Nov. 14, 2019

Related U.S. Application Data

(60) Provisional application No. 62/668,636, filed on May 8, 2018.

(51) Int. Cl.
*H04B 3/14* (2006.01)
*H04L 5/14* (2006.01)
*H04B 3/30* (2006.01)
*H04B 3/08* (2006.01)

(52) U.S. Cl.
CPC .............. *H04B 3/142* (2013.01); *H04B 3/08* (2013.01); *H04B 3/146* (2013.01); *H04B 3/148* (2013.01); *H04B 3/30* (2013.01); *H04L 5/14* (2013.01)

(58) Field of Classification Search
CPC . H04B 3/08; H04B 3/142; H04B 3/30; H04B 3/146; H04B 3/148; H04L 5/14
USPC ............ 370/286, 289; 375/257, 346; 455/78
See application file for complete search history.

(56) References Cited

U.S. PATENT DOCUMENTS

| | | | | |
|---|---|---|---|---|
| 10,511,345 B2* | 12/2019 | Yagil | ....................... | H04B 3/232 |
| 10,541,723 B2* | 1/2020 | Jin | ........................... | H04B 3/20 |
| 2016/0036490 A1* | 2/2016 | Wu | ........................... | H04B 3/32 |
| | | | | 375/257 |
| 2017/0244445 A1* | 8/2017 | Jin | ........................... | H04B 3/23 |

* cited by examiner

*Primary Examiner* — Barbara Summons
(74) *Attorney, Agent, or Firm* — Maschoff Brennan

(57) ABSTRACT

Systems and methods are provided for use of common mode rejection (CMR) for echo cancellation in uplink communications. A node in a cable network configured for transmitting downstream (DS) signals and receiving upstream (US) signals, may include echo cancelling circuits configured for cancelling echo introduced by the DS signals and/or transmittal of the DS signals, onto US signals and/or US reception path, to facilitate full-duplex (FDX) communications of the DS signals and US signal. The echo cancelling circuits may be configured for operating in the analog domain. The echo cancelling circuits may include an echo cancelling combiner configured for combining two or more upstream signals non-coherently.

13 Claims, 6 Drawing Sheets

METHODS AND SYSTEMS FOR USE OF COMMON MODE REJECTION (CMR) FOR ECHO CANCELLATION IN UPLINK COMMUNICATIONS

CLAIM OF PRIORITY

This patent application makes reference to, claims priority to and claims benefit from U.S. Provisional Patent Application Ser. No. 62/668,636, filed on May 8, 2018. The above identified application is hereby incorporated herein by reference in its entirety.

BACKGROUND

Aspects of the present disclosure relate to communication solutions. More specifically, certain implementations in accordance with present disclosure relate to methods and systems for use of common mode rejection (CMR) for echo cancellation in uplink communications. In this regard, conventional solutions, if any existing, for handling uplink communications (e.g., in cable based networks) and particularly echo related issues can be costly, inefficient, and/or ineffective.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for use of common mode rejection (CMR) for echo cancellation in uplink communications, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
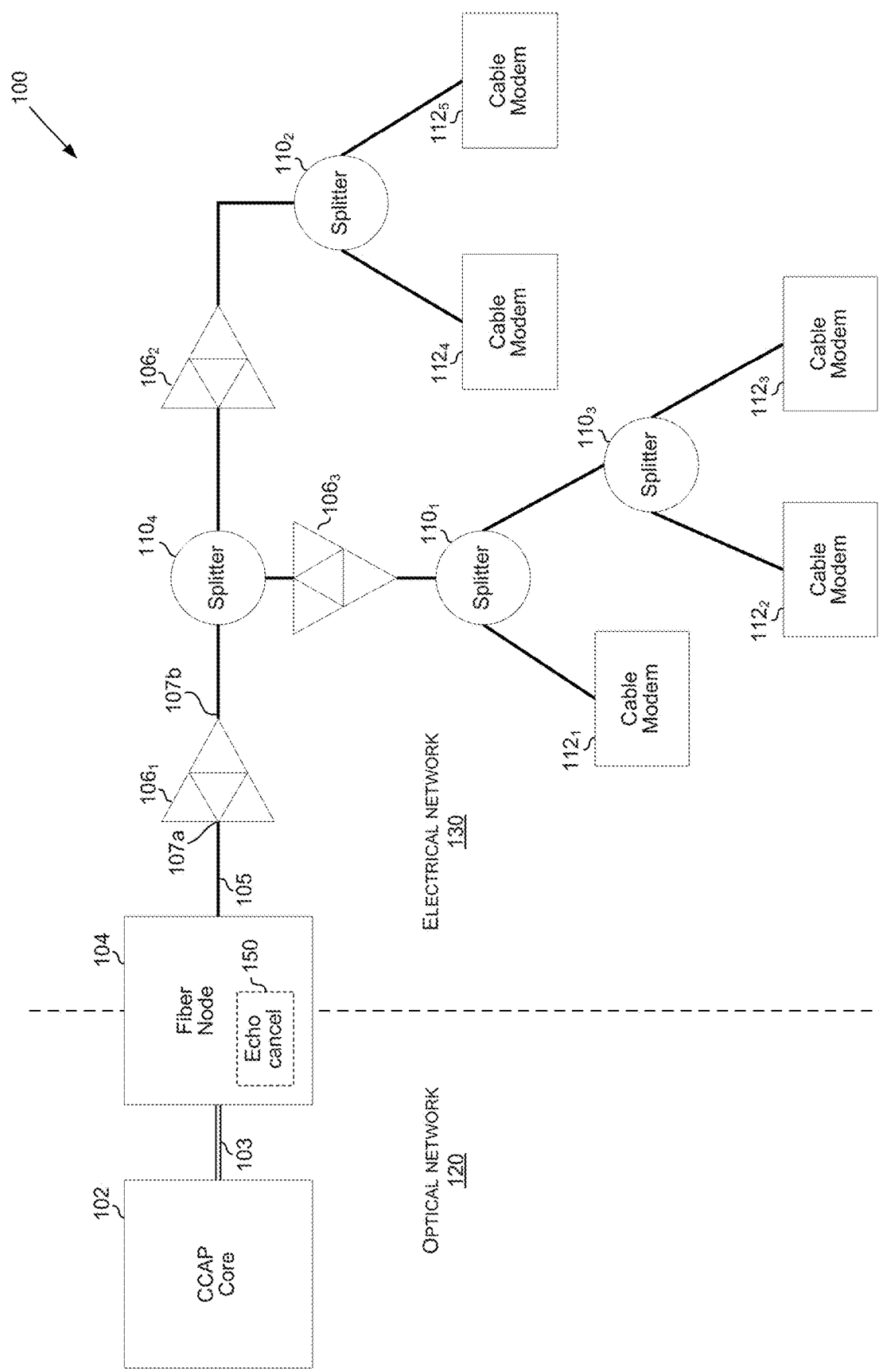
FIG. 1 illustrates an example hybrid fiber-coaxial (HFC) network.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

Various implementations in accordance with present disclosure relate to methods and systems for use of common mode rejection (CMR) for echo cancellation in uplink communications, particularly in systems utilizing full-duplex (FDX) based communications. In this regard, communication systems are typically designed such that there is separation between the transmit path (Tx) and the receive path (Rx). The separation may be accomplished with one of several methods. For example, frequency division multiplexing (FDM) may be used, with Tx and Rx (or signals corresponding thereto) located at or assigned to different frequencies. Time division multiplexing (TDM) may also be utilized, where Tx and Rx (or signals corresponding thereto) located at the same frequency, but not occurring at the same time to ensure the desired separation. Such techniques have some disadvantages, however, mainly due to the channel capacity being shared between the Tx and Rx direction.

Thus, Full-duplex (FDX) may be used to improve channel capacity without causing issues that may arise without sufficient separation. In this regard, use of FDX may allow transmitting and receiving in the same spectrum and simultaneously over the same medium. FDX has been used extensively in the plain old telephony system (POTS) for many years. In POTS a single wire (medium) is used to exchange voice signals between two stations at the same time in the same spectrum. This is accomplished by ensuring that transmitter does not receive its own signal, such as by electrically isolating an individual station's transmitter from its receiver and by canceling any echoes of the transmitted signal that are reflected back to the originating station. The primary advantage of FDX is that its use increases the amount of information that can be shared between two stations without increasing channel capacity. In POTS settings, use of FDX allows a single wire to be used between stations as opposed to two wires, thus reducing the system cost (e.g., by ½).

With cable communications, however, FDX was not used. For example, Data Over Cable System Interface Specification (DOCSIS) has traditionally used FDM to multiplex signals sent from the central office (CO) to a subscriber and to multiplex signals sent from a subscriber to the CO. Signals sent from the CO to the subscriber are commonly referred to as downstream (DS) signals, and signals sent from the subscriber to the CO are commonly referred to as upstream (US) signals. DS signals have traditionally resided in the higher frequencies, and US signals have resided in lower frequencies.

While such approach may have worked well for some time, the issue with this approach is that it is costly to change how much spectrum is dedicated to each direction. Also, existing cable systems are limited in total bandwidth by legacy infrastructure. Changing this infrastructure is cost prohibitive. Thus, the spectral width of the US plus the spectral width of the DS plus any guard band required between the two directions cannot exceed the total system bandwidth—that is, the system is limited by the equation: US+DS+Guard=Total Bandwidth; where total bandwidth is a constant.

Thus, increasing the amount of spectrum allocated for US must be traded off with the quantity of spectrum available for DS. Use of FDX technology, however, improves spectrum utilization—e.g., effectively changing the equation noted above to the following: US=DS=Total Bandwidth. This is because the DS and US can use the same spectrum simultaneously. Therefore, use of FDX is desirable (e.g., to cable operators) as deploying FDX will likely be less costly than changing the infrastructure to increase total bandwidth or switching to a different technology. Thus, DOCSIS is being extended to support FDX to increase both US and DS capacities while maintaining the spectral bandwidth that currently exists in a DOCSIS system.

To properly use FDX, however, measures should be taken to account for and address possible effects that communications in one direction (e.g., DS) may have on the other direction (e.g., US). Accordingly, in various implementations in accordance with the present disclosure, communication systems may be configured to utilize echo cancellation measures to account for and mitigate possible effects of downlink (DS) communications on uplink (US) communications at the CO level, as described in more detail below.

FIG. 1 illustrates an example hybrid fiber-coaxial (HFC) network. Shown in FIG. 1 is an example HFC network 100, which comprises a converged cable access platform (CCAP) core 102, a remote-PHY fiber node 104, amplifiers $106_1$-$106_3$, splitters $110_1$-$110_4$, and cable modems $112_1$-$112_5$.

The CCAP core 102 comprises suitable circuitry operable to handle data over coaxial service interface specification (DOCSIS) traffic to and from the cable modems $112_1$-$112_5$.

The remote-PHY fiber node 104 comprises suitable circuitry operable to provide an interface between an optical network 120 and an electrical network 130 in a DOCSIS network. The fiber node 104 is operable to communicate full-duplex (FDX) on one or more frequency bands on the electrical network 130.

Each of the amplifiers $106_1$-$106_3$ comprises a bidirectional amplifier operable to amplify downstream signals and upstream signals, where downstream signals are input via upstream interface 107a and output via downstream interface 107b, and upstream signals are input via downstream interface 107b and output via upstream interface 107a. The amplifier $106_1$, which amplifies signals along the main coaxial "trunk," may be referred to as a "trunk amplifier." The amplifiers $106_2$ and $106_3$, which amplify signals along "branches" split off from the trunk, may be referred to as "branch" or "distribution" amplifiers.

Each of the splitters $110_1$-$110_4$ comprises suitable circuitry operable to output signals incident on each of its interfaces onto each of its other interfaces. Each of the splitters $110_1$-$110_4$ may be a passive or active device which supports bidirectional transfer of signals.

Each of the cable modems $112_1$-$112_5$ is operable to communicate with, and be managed by, the CCAP core 102 in accordance with one or more standards (e.g., DOCSIS 3.0 and/or 3.1). Each of the cable modems $112_1$-$112_5$ may reside at the premises of a cable/DOCSIS subscriber.

In accordance with the present disclosure, the HFC network 100 may be configured to support use of common mode rejection (CMR) for echo cancellation in uplink communications. For example, the remote-PHY fiber node 104 may be configured to incorporate echo cancellation module 150, which may comprise suitable circuitry for setting and applying common mode rejection (CMR) based adjustments to US signals, to cancel or mitigate possible echo of DS transmissions on US signals. This is described in more detail with respect to FIGS. 2 and 3A-3C, below.

Figure 2:
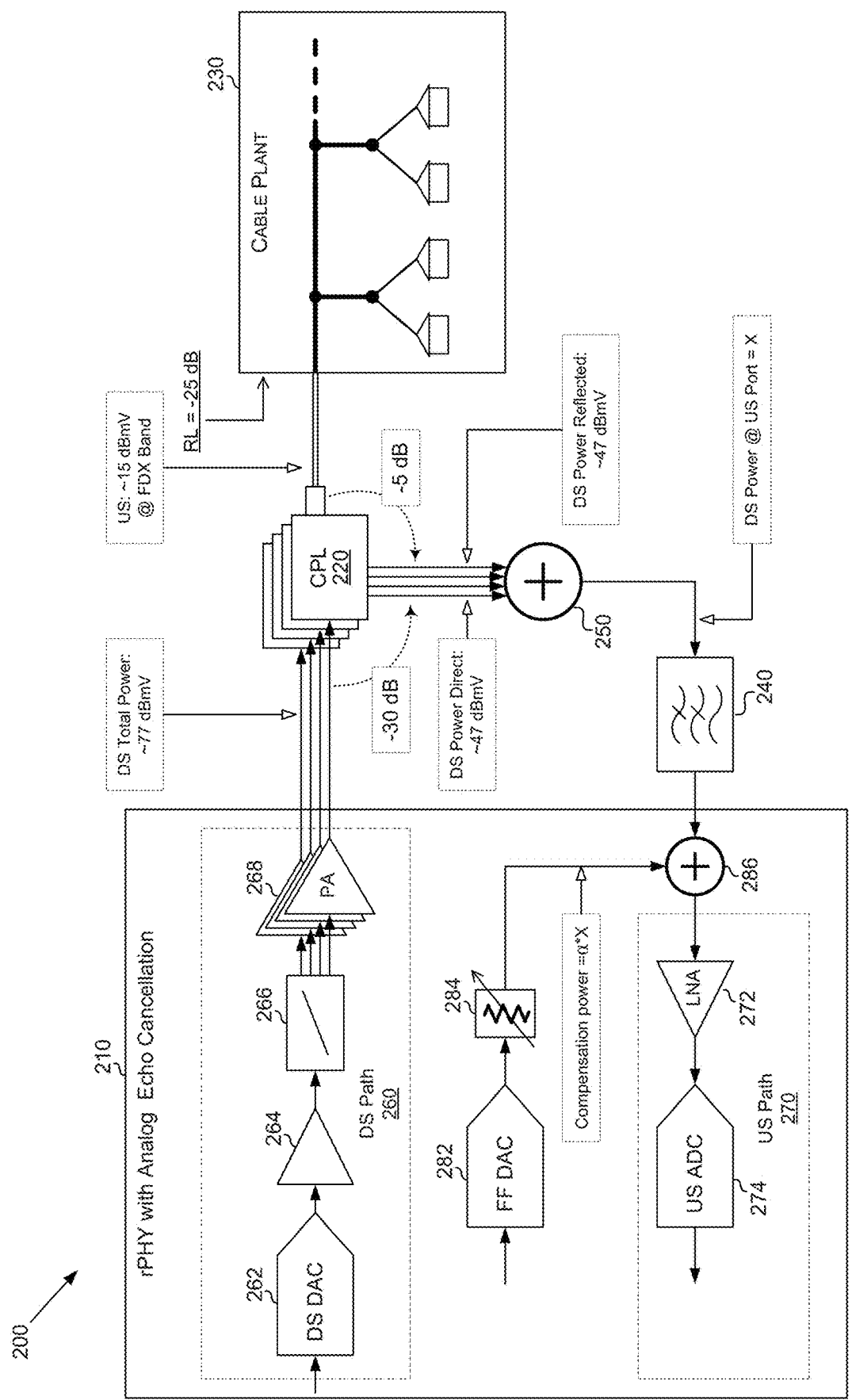
FIG. 2 illustrates an example a full-duplex (FDX) based transceiver that performs common mode rejection (CMR) based echo cancellation in uplink communications.

FIG. 2 illustrates an example a full-duplex (FDX) based transceiver that performs common mode rejection (CMR) based echo cancellation in uplink communications. Shown in FIG. 2 is an example communication system 200 that supports used of full-duplex (FDX) communications with common mode rejection (CMR) based echo cancellation in uplink communications.

The system 200 as shown in FIG. 2 comprises a remote-PHY (rPHY) node 210, which may be substantially similar to the remote-PHY fiber node 104 of FIG. 1. In this regard, rPHY node 210 comprises suitable circuitry operable to handle communication of data over coaxial service interface specification (DOCSIS) based with traffic (e.g., DOCSIS 3.0 and/or 3.1 based traffic) to and from a plurality of cable modems (subscribers) within a cable plant 230. In this regard, the cable plant 230 may be substantially similar to, and/or may comprise components such as those in the electrical network 130 of FIG. 1.

The rPHY node 210 may comprise, for example, a downstream (DS) path 260 comprising suitable circuitry for processing DS signals for transmittal onto the cable plant 230, and an upstream (US) path 270 comprising suitable circuitry for processing US signals received from cable plant 230. For example, as shown in FIG. 2, the DS path 260 (or portion thereof shown in FIG. 2) may comprise a downstream (DS) digital-to-analog converter (DAC) circuit 262, an preamp circuit 264, a pre-emphasis (tilt) circuit 266, and one or more power amplifier (PA) circuits (e.g., a PA circuit 268 for each cable lines or paths). The US path 270 (or portion thereof shown in FIG. 2) may comprise a low-noise amplifier (LNA) circuit 272 and an upstream (US) analog-to-digital converter (ADC) circuit 274. Further, the rPHY node 210 may be configured to communicate full-duplex on one or more particular frequency bands, as described above.

In this regard, the rPHY node 210 may be configured to incorporate echo cancellation, particularly analog echo cancellation, such as by setting and applying CMR based adjustments to US signals. In this regard, one of the main challenges of any FDX system, is dealing with a high transmit (Tx) power, associated with DS transmissions, leaked or reflected to the receiver (Rx) port, on which the US signals are received. Thus, in accordance with the present disclosure, to protect analog components in the transceiver (the node) and performance thereof, a special cancellation signal (linear function of transmitted signal) may be injected into receiver input, to remove undesired transmitted (Tx) signal(s), which may appear at the receiver (or US) port.

While the undesired Tx signal may be cancelled completely, additional noise—e.g., driven by the compensation path performance, such as compensation DAC Enob (effective number of bits), may be injected into the receiver path, and which may determine the final SNR performance. Such injected noise may be a direct function of the raw (e.g., initial/un-cancelled) Tx signal power, appearing at receiver (Rx) port (shown as "X" in FIG. 2). In this regard, the lower the Tx signal power, the better the performance ("dB per dB"). In other words, reducing the initial Tx signal power, inside the receiver (Rx) path directly improves final performance.

Typically, cable systems comprise one or more nodes, each servicing a number of subscribers (e.g., cable modems in homes), with the node having a number RF cables (e.g., 4 cable in the implementation shown in FIG. 2) exiting from the rPHY node that share a common signal. In this regard, while a unique signal may be used for each RF cable this may not be desirable as it may increase system cost.

The Tx power, at or inside receiver (Rx) port/path, may be driven by 2 components: 1) Tx signal reflected from cable plant (shown as "DS power reflected" in FIG. 2), and 2) direct leakage/isolation via "on board" components (shown as "DS power direct" in FIG. 2). In this regard, the DS power reflected may be a function of overall RL (return loss) from the cable plant, whereas the DS power direct may be a function of the analog components (e.g., printed circuit board (PCB) components implementation/isolation). This DS power direct component may be mitigated, such as using echo cancellation within the rPHY node.

For example, as shown in FIG. 2, the system 200 may be configured to support echo cancellation system (particularly analog cancellation, which typically drives the overall performance). In this regard, as illustrated the rPHY node 210 has 4 paths cable plant, which are coupled (via couplers 220) to feed into the cable plant 230. As mentioned above, the DS Power @ US port ("X") is what eventually may determine the overall system performance. The parameters that determine this undesired power may include: 1) the transmitted signal—i.e., the DS total (e.g., 77 dBmV as shown in the example use scenario in FIG. 2); 2) the coupling—at couplers 220 (e.g., 30 dB as shown in the example use scenario in FIG. 2); 3) the RL (return loss) of the cable plant 220 (e.g., 25 dB as shown in the example use scenario in FIG. 2); and 4) the cables combining (of the 4 cables), which is then fed into the receiver (or US) port—e.g., via a low pass filter 240.

The cable combining may be adjusted to achieve the desired echo cancellation. In this regard, while the first three parameters may not be affected or changed, the cable combining may be harnessed and utilized—that is, the correlation of the 4 direct signal paths. For example, combiner 250 may be utilized to combine the input signals in an adaptive manner. In this regard, the combiner 250 may comprise suitable circuity for combining signals from multiple input ports (e.g., corresponding to the different RF cables) into one output port, and to remove any common mode signals during the combining, particularly based on common mode rejection (CMR). In particular, Tx power X applicable to the receive (Rx) port may be determined by the correlation between the 4 input signals, and the way those are combined. In this regard, the signal reflected from the cable plant may be combined un-coherently (in power), due to a dispreading (de-correlation) of the 4 paths, stemming from different cable lengths, and reflections. The echo cancellation may also include applying compensation signal with the node—e.g., post the US port, but before the US path 270. For example, the compensation signals may be applied via a feed-forward (FF) digital-to-analog convertor (DAC) circuit 282, which is combined with the US signal via a combiner 286 (after adjustment via a variable resister circuit 284). In this regard, the compensation signal may be configured (e.g., by adjusting the digital input into the FF DAC circuit 282) to partially cancel the DS echo and/or leakage signals in US and FB paths. The adaptive combining and adjustments thereof, and effects of using such combining, are illustrated with respect to FIGS. 3A-3C.

Figure 3A:
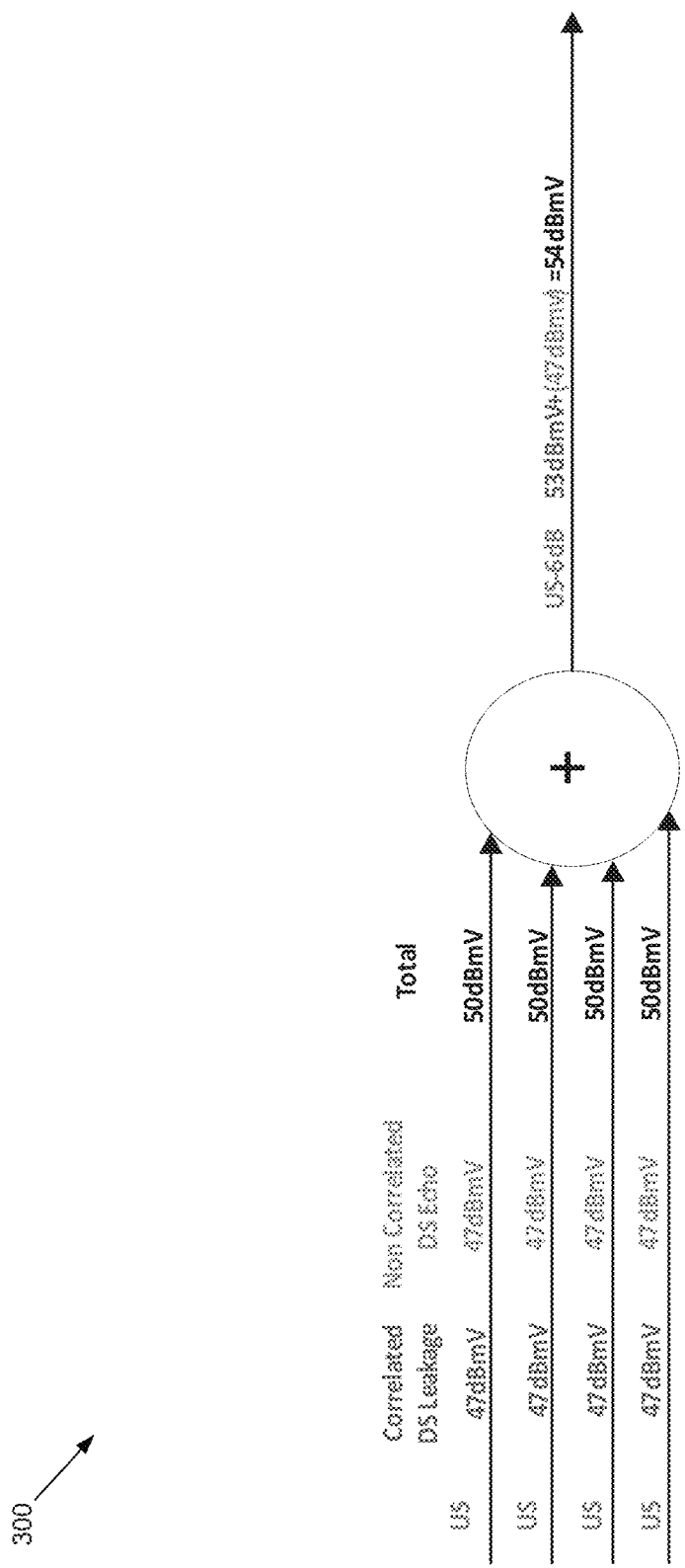
FIGS. 3A-3C illustrate example signal combining use scenarios during echo cancellation in uplink communications.
Figure 3B:
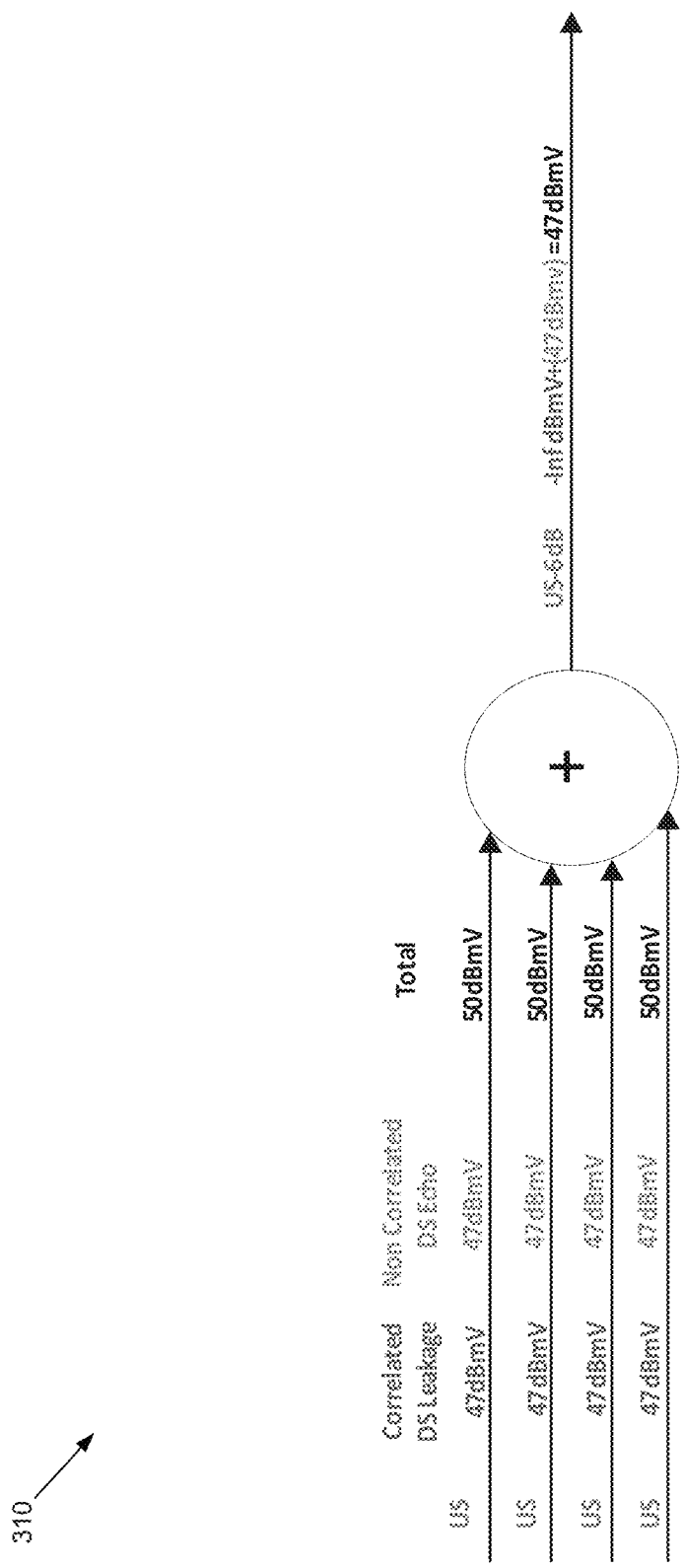
Figure 3C:
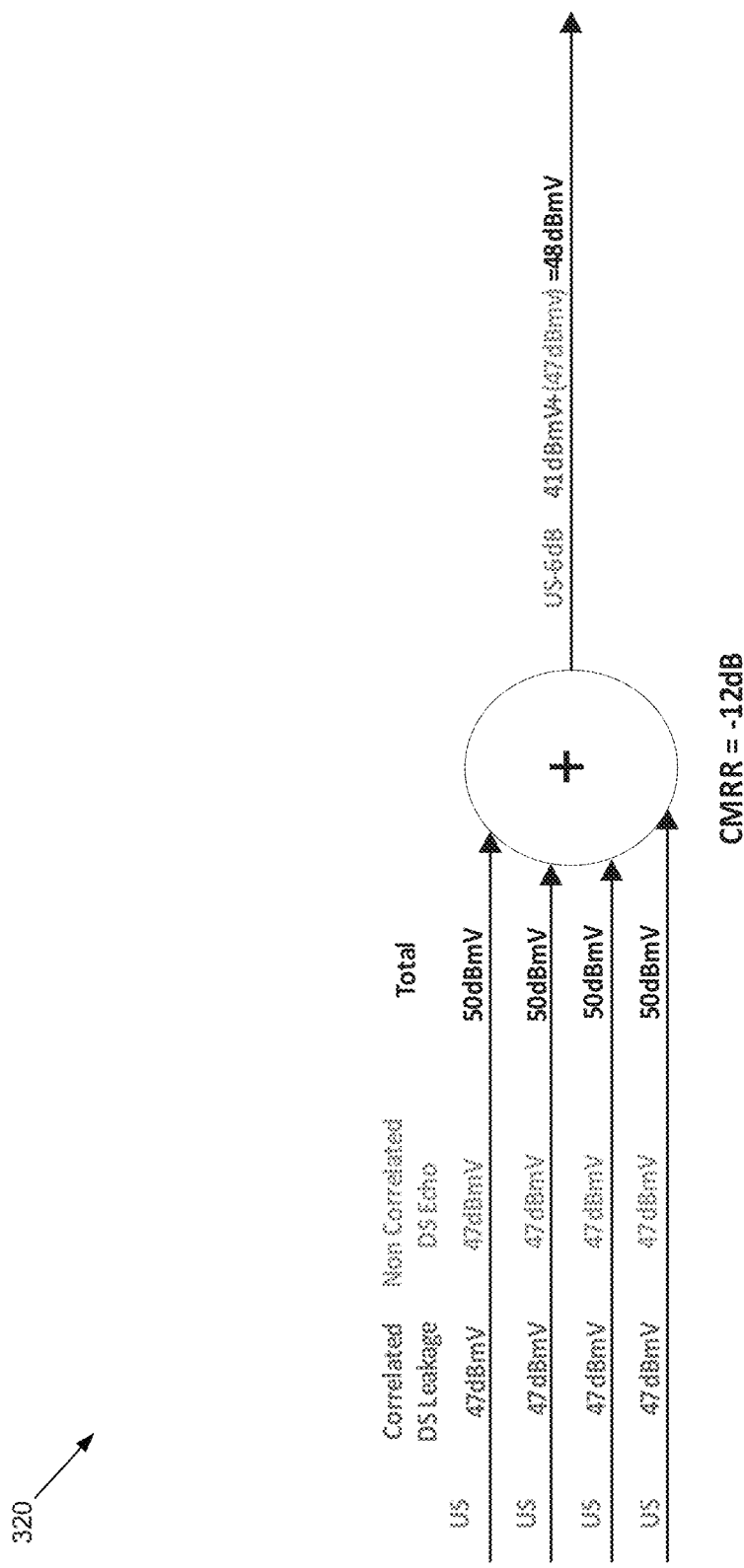

FIGS. 3A-3C illustrate example signal combining use scenarios during echo cancellation in uplink communications.

Shown in FIG. 3A is an example coherent combining of input signals (e.g., the four signals (parameters) of the system 200 of FIG. 2). In this regard, unless special methods will be applied, the four signals going through the 4 direct paths may be combined coherently (in-phase).

Shown in FIG. 3B is an example non-coherent combining of input signals (e.g., the four signals (parameters) of the system 200 of FIG. 2). In this regard, in accordance with the present disclosure the combiner 250 may be configured to combine the 4 signals non-coherently (negative phase)—i.e., leveraging and take advantage of the fact, that the 4 input signals being combined via the combiner 250 are coherent, and as such may be combined destructively, thus reducing the overall power—that is, the DS Power at US port (or X, in FIG. 2) significantly (e.g., from 54 dBmv, as shown in FIG. 3A, to 47 dBmv). Thus, the un-correlated signals at the combiner input (such as the reflected Tx, and the Rx signals) will be always combined un-coherently (in power).

Shown in FIG. 3C is an example practical non-coherent combining of input signals (e.g., the four signals (parameters) of the system 200 of FIG. 2). In this regard, in accordance with the present disclsoure the combiner 250 may be configured to combine the 4 signals in practical non-coherent (negative phase) manner—that is, with a finite common (or correlative) signal rejection, such as with a common mode rejection ratio (CMRR) of −12 dB.

As it can be seen from the comparison between FIGS. 3C and 3A, there's a direct benefit of incorporating the non-coherent combiner—e.g., 6 dB SNR improvement, in particular use scenario example shown therein.

Figure 4:
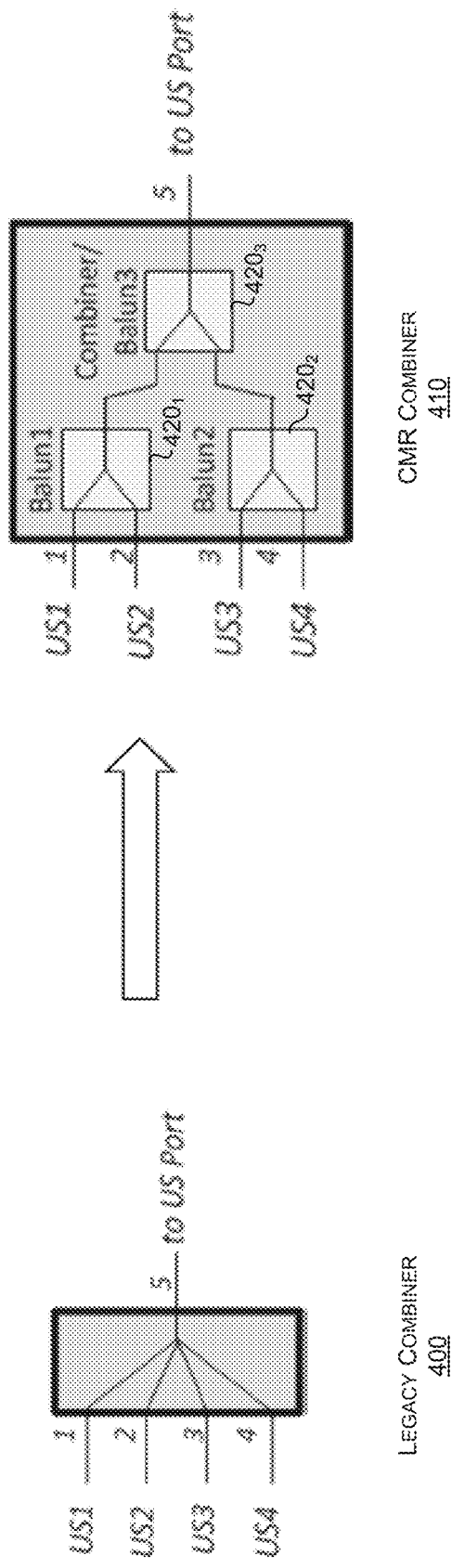
FIG. 4 illustrates an example common mode rejection (CMR) combiner, for use in systems providing CMR based echo cancellation in uplink communications, in accordance with the present disclosure.

FIG. 4 illustrates an example common mode rejection (CMR) combiner, for use in systems providing CMR based echo cancellation in uplink communications, in accordance with the present disclosure. Shown in FIG. 4 is a legacy combiner 400 and a common mode rejection (CMR) combiner 410.

Each of the legacy combiner 400 and the CMR combiner 410 comprise suitable circuitry for combining signals, particularly upstream (US) signals for communication via a single upstream (US) port. In this regard, as shown in FIG. 4, both of the legacy combiner 400 and the CMR combiner 410 are configured for combining 4 upstream (US) signals (US1, US2, US3, and US4) for communication via a single US port. However, whereas the legacy combiner 400 merely combines the US signals, the CMR combiner 410 incorporates an architecture configured for providing common mode rejection (CMR) based echo cancellation.

For example, the CMR combiner 410 may comprise a number of 2-to-1 balanced to unbalanced (balun) combiner circuits 420, each of which configured to combine two input signals onto a single output signal. Thus, in the example implementation illustrated in FIG. 4, the CMR combiner 410 comprises three 2-to-1 balun combiner circuits $420_1$, $420_2$, and $420_3$. Each of the balun combiner circuits $420_1$ and $420_2$ combines a pair the upstream signals—e.g., with the balun combiner circuit $420_1$ combining input signals US1 and US2 onto a single combined output, and the balun combiner circuit $420_2$ combining input signals US3 and US4. The balun combiner circuit $420_3$ then combines the outputs of the balun combiner circuits $420_1$ and $420_2$ onto a single total output signals, corresponding to the four US inputs signals onto a single output fed onto the US port. The balun combiner circuits $420_1$, $420_2$, and $420_3$ are designed and/or configured to provide combining in accordance with an optimized common mode rejection ratio (CMRR) based model, as described above with respect to FIG. 3C for example.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for use in a node of a cable network, the system comprising:
one or more transmission circuits configured for transmitting downstream (DS) signals in the cable network;
one or more reception circuits configured for receiving upstream (US) signals in the cable network;
one or more echo cancelling circuits configured for cancelling echo introduced by transmitting of downstream signals onto upstream reception path, wherein the one or more echo cancelling circuits comprise a feed-forward (FF) digital-to-analog convertor (DAC) circuit,
the FF DAC to output an analog signal to combine with a signal corresponding to an output of one or more echo cancelling combiner circuits; and
a variable resistor circuit coupled to the FF DAC, the variable resistor circuit configured to selectively adjust the analog signal before the analog signal is combined with the signal corresponding to the output of the one or more echo cancelling combiner circuits, wherein:
the one or more transmission circuits and the one or more reception circuits are configured for supporting full-duplex (FDX) communications via the cable network;
the one or more echo cancelling circuits are configured at least for mitigating direct leakage associated with the DS signals, that is introduced onto the US signals; and
the one or more echo cancelling circuits are configured for operating in the analog domain.

2. The system of claim 1, wherein the one or more transmission circuits are configured to generate the downstream (DS) signals as data over coaxial service interface specification (DOCSIS) based signals.

3. The system of claim 1, wherein the one or more reception circuits are configured to handle data over coaxial service interface specification (DOCSIS) based upstream (US) signals.

4. The system of claim 1, wherein the one or more echo cancelling circuits comprise the echo cancelling combiner circuit that is configured for combining two or more upstream signals non-coherently.

5. The system of claim 4, wherein the echo cancelling combiner circuit comprises a plurality of balanced to unbalanced (balun) combiner circuits.

6. The system of claim 5, wherein the plurality of balun combiner circuits is arranged such as a plurality of inputs into the echo cancelling combiner circuit are combined via the plurality of balun combiner circuits in non-coherent manner.

7. The system of claim 5, wherein each balun combiner circuit of the plurality of balun combiner circuits comprises a 2-to-1 combiner circuit.

8. The system of claim 5, wherein:
the echo cancelling combiner circuit is configured to receive four inputs;
the plurality of balun combiner circuits comprises three 2-to-1 balun combiner circuits;
each of a pair of the three 2-to-1 balun combiner circuits is configured to receive two different one of the four inputs; and
a last of the three 2-to-1 balun combiner circuits is arranged to receive an output from each of the pair of the three 2-to-1 balun combiner circuits.

9. A system for use in a node of a cable network, to support full-duplex (FDX) communications via the cable network, the system comprising:
an echo cancelling combiner circuit that is configured for combining two or more upstream (US) signals non-coherently, wherein:

the echo cancelling combiner circuit is configured at least for mitigating direct leakage associated with downstream (DS) signals, that is introduced onto the US signals, the mitigating including selectively injecting a signal that has been conditioned by a variable resistor circuit; and the echo cancelling combiner circuit is configured for operating in the analog domain.

10. The system of claim 9, wherein the echo cancelling combiner circuit comprises a plurality of balanced to unbalanced (balun) combiner circuits.

11. The system of claim 10, wherein the plurality of balun combiner circuits is arranged such as a plurality of inputs into the echo cancelling combiner circuit are combined via the plurality of balun combiner circuits in non-coherent manner.

12. The system of claim 10, wherein each balun combiner circuit of the plurality of balun combiner circuits comprises a 2-to-1 combiner circuit.

13. The system of claim 12, wherein:
the echo cancelling combiner circuit is configured to receive four inputs;
the plurality of balun combiner circuits comprises three 2-to-1 balun combiner circuits;
each of a pair of the three 2-to-1 balun combiner circuits is configured to receive two different one of the four inputs; and
a last of the three 2-to-1 balun combiner circuits is arranged to receive an output from each of the pair of the three 2-to-1 balun combiner circuits.

* * * * *